(12) United States Patent
Hsu et al.

(10) Patent No.: US 10,567,397 B2
(45) Date of Patent: Feb. 18, 2020

(54) SECURITY-BASED CONTAINER SCHEDULING

(71) Applicant: Hewlett Packard Enterprise Development LP, Houston, TX (US)

(72) Inventors: Wan-Yen Hsu, Cupertino, CA (US); Hui-Zhi Zhao, Beijing (CN); Ligong Duan, Beijing (CN)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 140 days.

(21) Appl. No.: 15/420,996

(22) Filed: Jan. 31, 2017

(65) Prior Publication Data

US 2018/0219877 A1    Aug. 2, 2018

(51) Int. Cl.
*H04L 29/06* (2006.01)
*G06F 21/62* (2013.01)

(52) U.S. Cl.
CPC .......... *H04L 63/1408* (2013.01); *G06F 21/62* (2013.01)

(58) Field of Classification Search
USPC .......................................................... 726/22
See application file for complete search history.

(56) References Cited

U.S. PATENT DOCUMENTS

| | | | | |
|---|---|---|---|---|
| 7,587,570 | B2* | 9/2009 | Sarkar | G06F 3/0605 711/170 |
| 9,170,797 | B2 | 10/2015 | Raman | |
| 9,336,060 | B2 | 5/2016 | Nori et al. | |
| 9,521,115 | B1* | 12/2016 | Woolward | H04L 63/0263 |
| 10,127,030 | B1* | 11/2018 | Mortman | G06F 8/64 |
| 10,154,065 | B1* | 12/2018 | Buchler | H04L 63/20 |
| 2003/0154401 | A1* | 8/2003 | Hartman | H04L 63/102 726/30 |
| 2009/0049236 | A1* | 2/2009 | Kinoshita | G06F 3/0605 711/112 |
| 2014/0189777 | A1* | 7/2014 | Viswanathan | H04L 63/105 726/1 |
| 2015/0169306 | A1 | 6/2015 | Labocki et al. | |
| 2016/0283713 | A1 | 9/2016 | Brech et al. | |
| 2016/0378846 | A1* | 12/2016 | Luse | G06F 17/30097 707/740 |
| 2017/0093923 | A1* | 3/2017 | Duan | H04L 63/1408 |
| 2017/0116415 | A1* | 4/2017 | Stopel | G06F 21/554 |
| 2017/0300697 | A1* | 10/2017 | Iyer | G06F 21/44 |

FOREIGN PATENT DOCUMENTS

| | | |
|---|---|---|
| EP | 2216731 A2 | 8/2010 |
| WO | WO-2015163799 A1 | 10/2015 |
| WO | WO-2016099346 | 6/2016 |

OTHER PUBLICATIONS

Linthicum, D., Scaling Containers: the Essential Guide to Container Clusters, (Web Page), http://techbeacon.com/scaling-containers-essential-guide-container-clusters, Retrieved Dec. 20, 2016, 14 Pgs.

* cited by examiner

*Primary Examiner* — Shin-Hon (Eric) Chen
(74) *Attorney, Agent, or Firm* — Hewlett Packard Enterprise Patent Department

(57) ABSTRACT

Examples disclosed herein relate to a security-based container scheduling system for allocating a container to a node. A discovery engine discovers a node in a cluster of nodes and a node security attribute associated with the node. A translation engine generates a node selector from a container security attribute specified in metadata associated with the container.

12 Claims, 7 Drawing Sheets

SECURITY-BASED CONTAINER SCHEDULING

BACKGROUND

Software containers have emerged to address the increasing portability needs of software applications. A container bundles an application and all its dependencies and libraries into an isolated, resource controlled and easy-to-deploy building block that can run on any operating system in any computing environment. Containers can be deployed on either physical or virtual machines in private, public or hybrid clouds, thereby facilitating workload management of large scale applications. Multiple containers can run on a single machine and share the operating system kernel, while keeping processes and resources such as memory, CPU and disks isolated from each other. This makes container deployment efficient, fast and lightweight.

There are several popular container development and management systems available, such as for example. Docker, Rocket and Kubernetes. These systems include tools for creating and running container images, which are the files that make up the applications that run inside a container. Image files contain all the requirements for running a single container, as well as metadata delineating information and attributes associated with the container.

System administrators can use container orchestration engines to manage and schedule the allocation and deployment of containers to a server or cluster of servers. Container orchestration engines such as Kubernetes and Docker Swarm provide basic scheduling capabilities, focusing mainly on CPU, memory and storage requirements. Poor management and scheduling of containers can lead to an inefficient utilization of underlying resources and a mismatch between workloads and resources.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Figure 1:
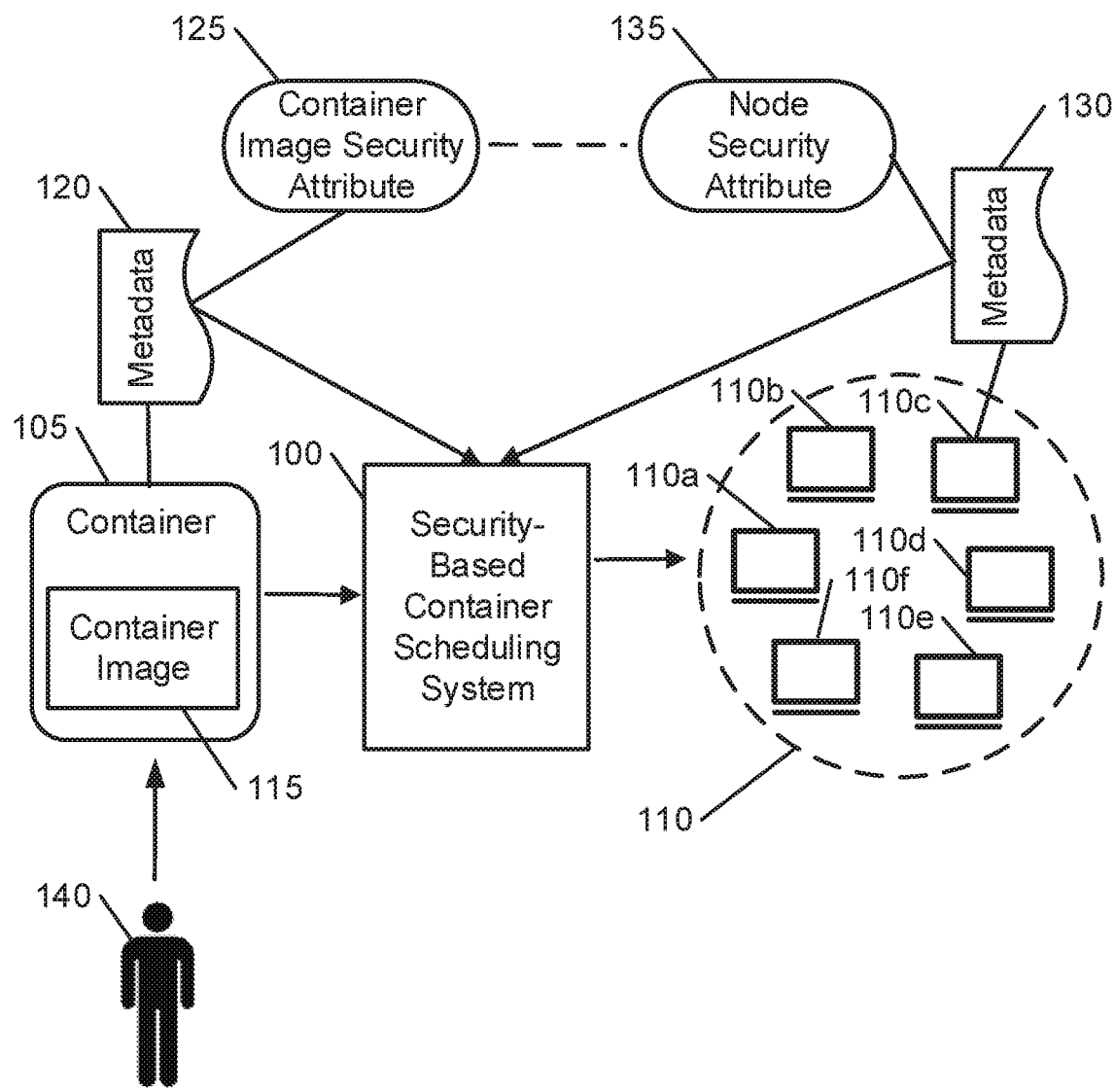
FIG. 1 illustrates a schematic diagram of an environment where a security-based container scheduling system is used in accordance with various examples.

A security-based container scheduling system for scheduling a software container to a node is disclosed. The security-based container scheduling system automates container scheduling while taking into account security requirements of the container's workload. Each container is allocated to a node with security attributes that match the security requirements of the container's workload, thereby ensuring that security is automatically integrated upfront and maintained throughout container development and deployment. Maintaining security is critical for many container workloads, such as those that deal with sensitive data or those that are deployed in a multi-tenant cloud environment.

As generally described herein, a node refers to a computing device on a network, either a virtual or physical machine, such as a personal computer, a cell phone, a printer, or a server, among others. Security attributes associated with a node may include, for example, whether secure boot or a Federal Information Processing Standard ("FIPS") mode is enabled, whether the node has Trusted Platform Module ("TPM") hardware, whether the node has a specific firmware version that contains hot security fixes, or any other security attribute that may be associated with a node. Each node may have metadata associated with it, which may be in the form of labels or annotations specifying different attributes (e.g., security attributes) related to the node. Likewise, a container image may have metadata specifying different requirements and attributes associated with the container image. An example security attribute associated with a container image may be that the container image is required to run on a node with a specific version x of Secure Sockets Layer ("SSL").

In various examples, the security-based container scheduling system is implemented with a discovery engine and a translation engine. The discovery engine discovers a node and its node security attributes automatically. The translation engine enables container security attributes identified in container image's metadata to be converted into node selectors for templates or passed as parameters in Command Line Interfaces ("CLIs") or Application Program interfaces ("APIs") used in container creation. In the SSL example above, a node selector specifying "SSL_version=x" may be added to a container creation template or passed as a parameter in a container creation CLI/API. A container scheduler scans metadata associated with nodes, such as for example, nodes that are part of a cluster of nodes, to select a node that has node security attributes listed in its metadata that match the node selectors in the container's creation template or CLI/API. The container is then allocated to the selected node to ensure that its security requirements are maintained throughout its deployment.

It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

Referring now to FIG. 1, a schematic diagram of an environment where a security-based container scheduling system is used in accordance with various examples is described. Security-based container scheduling system 100 enables a container 105 to run on a selected node in a cluster of nodes 110 while maintaining its security requirements throughout its deployment. A container, as generally described herein, refers to a running instance of an image, which may include an application, its dependencies, libraries, a file system, parameters and all the files required to run it. A container image may have associated metadata specifying different attributes and requirements for running the container. For example, container 105 has container image 115 with associated container image metadata 120 that includes container image security attribute 125. Container image security attribute 125 may be in the form of a label or annotation specifying a security requirement for running the container 105. Multiple security attributes and other attributes may be included in container image's metadata 120.

Cluster of nodes 110 may include multiple nodes 110a-f, which may be either virtual or physical machines connected via a network. Each node 110a-f in cluster 110 may also have associated metadata, such as metadata 130 associated with node 110c. Metadata 130 may include labels or annotations specifying attributes associated with node 110c, such as for example, a node security attribute 135.

The security-based container scheduling system 100 ensures that container 105 is allocated to a node in cluster 110 that has a node security attribute 135 that matches the container image security attribute 125 (e.g., node 110c). Administrator 140 may specify container image security attribute 125 in container image metadata 120. The security-based container scheduling system 100 then automates all the operations required to have container 105 running smoothly and securely in a node in cluster 110. These operations may include discovery of a node in cluster 110, discovery of its security attributes, labeling of the node with its discovered security attributes in its metadata, generating a node selector from the container image security attribute 125, and scheduling the container 105 with the node selector matching a discovered security attribute.

Figure 2:
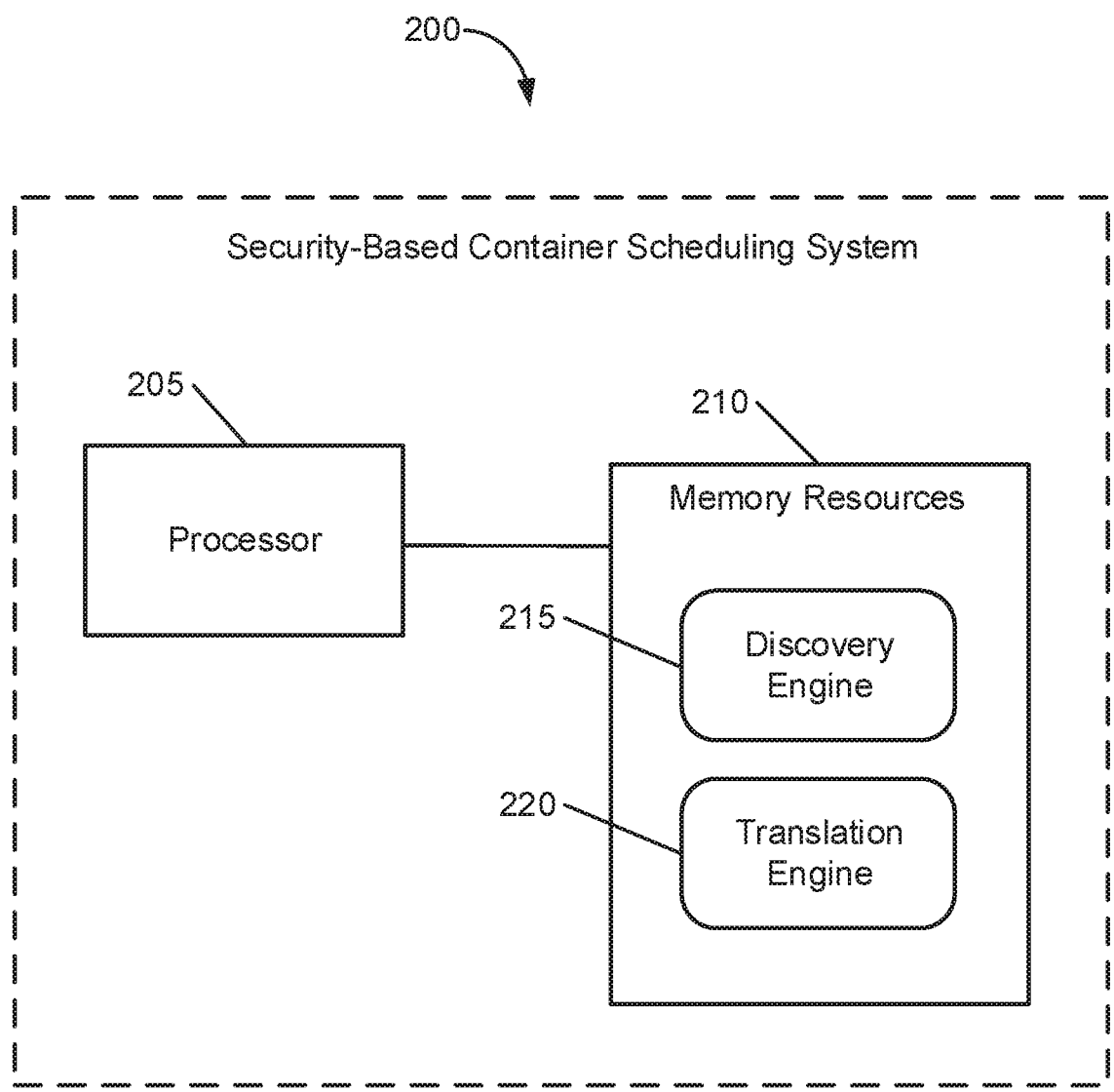
FIG. 2 is a block diagram of an example security-based container scheduling system which may be incorporated into the environment of FIG. 1.

Attention is now directed to FIG. 2, which shows a block diagram of an example security-based container scheduling system which may be incorporated into the environment of FIG. 1. Security-based container scheduling system 200 has a processor 205 and a set of memory resources 210. A memory resource, as generally described herein, can include any number of volatile or non-volatile memory components capable of storing instructions that can be executed by a processor. It is appreciated that memory resources 210 may be integrated in a single device or distributed across multiple devices. Further, memory resources 210 may be fully or partially integrated in the same device (e.g., a server) as their corresponding processor 205 or it may be separate from but accessible to their corresponding processor 205.

Memory resources 210 store a discovery engine 215 and a translation engine 220 for security-based container scheduling system 200. It is appreciated that other engines can be added to memory resources 210 for additional or alternative functionality. Each of engines 210 and 215, and any other engines added to memory resources 210, may be any combination of hardware (e.g., a processor or other circuitry) and software (e.g., machine or processor-executable instructions, commands, or code such as firmware, programming or object code) to implement the functionalities of the respective engine. Such combinations of hardware and software may be implemented in a number of different ways.

Discovery engine 215 has instructions to discover a node that is associated with a specific scope. For example, the scope can include all nodes connected to a given network switch, all nodes connected to a vLAN, all nodes connected to a rack, all nodes within a specified IP range, all nodes in a cluster of nodes, or all nodes in a logical group that have the same properties (e.g., all nodes of a specific hardware or server model). The discovery engine 215 may employ different instructions to discover a node, depending on the node's scope. For example, the discovery engine 215 may employ the Link Layer Discovery Protocol ("LLDP") to discover a node connected to a switch, the Simple Service Discovery Protocol ("SSDP") or iLO Federation with an IP address filter to discover a node within a specified IP range, or SSDP or iLO Federation with hardware attribute filters to discover a node in a logical group of nodes with specific hardware properties.

Once a node associated with a specific scope has been discovered, the discovery engine 215 proceeds to discover a node security attribute associated with the node and create the corresponding security attribute labels for the node. Discovery of a security attribute may be performed with, for example, a Baseboard Management Controller ("BMC") out-of-band interface resident in a server wherein processor 205 and memory resources 210 are located. In various examples, RedFish API or in-band OS commands may be used for this security attribute discovery. For instance, RedFish can be used to discover whether secure boot or FIPS mode is enabled for a node, whether the node has TPM hardware, whether the node has a specific firmware version that contains hot security fixes, and so on. An OS command can be used to discover the OS and SSL/TLS versions of the node. It is appreciated that any number of security attributes may be discovered for a node, using these or other discovery commands or protocols.

Upon discovery of security attribute(s) for a node, the discovery engine 215 creates the corresponding security attribute labels for the node and adds them to metadata associated with the node (e.g., metadata 130 associated with node 110c in FIG. 1). For example, if the discovery engine 215 discovers that a node has TPM and secure boot is enabled, the discovery engine 215 inserts labels or annotations in the node's metadata to reflect the presence of TPM and secure boot for that node. The discovery engine 215 may do this for every node in a cluster of nodes, e.g., nodes 110a-f in cluster 110 of FIG. 1, so that each node in the cluster is labeled with its security attributes) in its metadata.

With all nodes labeled with their security attribute(s), ensuring that a container will execute securely throughout its deployment becomes a matter of allocating the container to the right node with the security-based container scheduling system 200. This is achieved by first having administrators (e.g., administrator 140 shown in FIG. 1) specify desired security requirements for a container in its container's image metadata, e.g., metadata 120 associated with container image 115 shown in FIG. 1. The administrator 140 can do so when creating the container image or when creating a container creation template. When the administrator 140 sends a request to deploy container 105 in cluster 110, the security-based container scheduling system 200 triggers its translation engine 220 to generate one or more node selectors from the container security attribute(s) specified in the container's image metadata. The translation engine 220 then associates the node selector(s) with the container, such as, for example, by inserting the node selector(s) in the container creation template or passing it as a parameter in the container creation CLI/API. A node selector, as generally described herein, is a label that indicates specific requirements or attributes (e.g., security attributes) that a node needs to have to host a container. For example, a node selector can specify that secure boot is required for the container to run. The node selector can be a label of the form "secure_boot=yes" added to the container's creation template.

Figure 3:
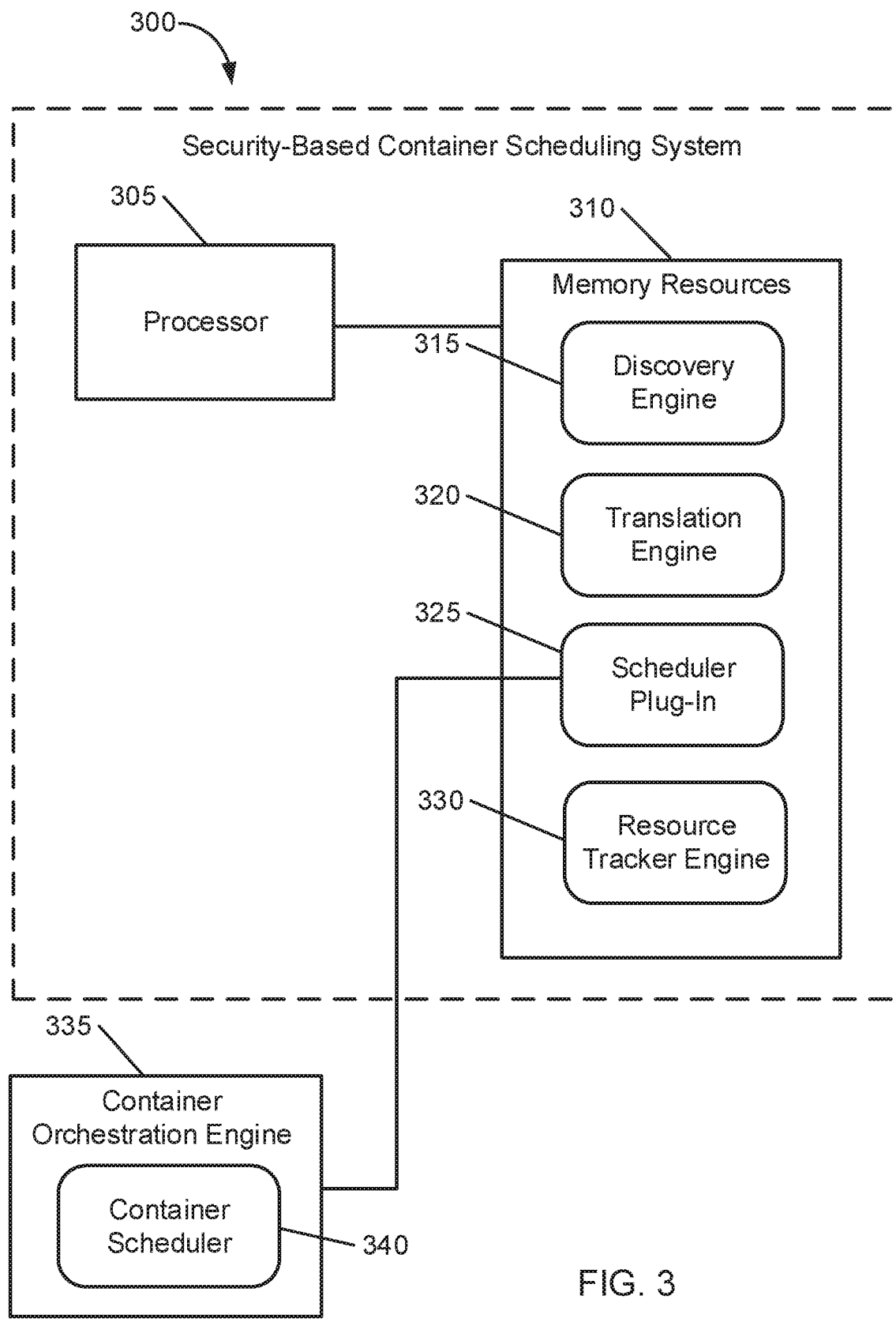
FIG. 3 is a block diagram of another example security-based container scheduling system which may be incorporated into the environment of FIG. 1.

Referring now to FIG. 3, it is appreciated that a security-based container scheduling system such as system 300 may work in conjunction with a container orchestration engine 335, such as, for example, Docker Swarm, Kubernetes, Amazon EC2 Container Service, Azure Container Service, or any other system for deploying containers to a node or cluster of nodes. Such container orchestration engines enable administrators to schedule containers in a cluster and manage them based on specific requirements. In various examples, the security-based container scheduling system 300 enables a container scheduler 340 in a container orchestration engine 335 to schedule a container with security attributes defined in its associated metadata to a node that matches those attributes.

The security-based container scheduling system 300 guarantees that nodes are labeled with their discovered node security attributes and that when containers are created, the container security attributes specified in the container's image metadata are captured by node selectors injected into the container creation templates. The discovery engine 315 may also automatically register the discovered node security attributes into a container resource database associated with container scheduler 340. In various examples, a container scheduler plug-in 325 may be implemented to work with a container scheduler 340 in a container orchestration engine 335 to ensure that multiple security attributes are supported. A resource tracker engine 330 may also be used to track the availability of security resources for the nodes. The resource tracker engine 330 may keep a list of available security resources throughout container deployment. The scheduler plug-in 325 checks whether a node has the available security resource before placing the container on the node. After the container has been created, the scheduler plug-in 325 then allocates the security resource to the container and removes the allocated security resource from the list of available security resources.

It is appreciated that the security-based container scheduling system 300 may be integrated with container orchestration engine 335 or it may be a separate system in a management server used for provisioning and managing a cluster of nodes. In various examples, the security-based container scheduling system 300 may also be implemented in a virtual machine, as a container itself, or in any other mechanism to ensure that containers are allocated to nodes with matching security attributes. It is also appreciated that security-based container scheduling system 200 of FIG. 2 can include one of more structural or functional aspects of security-based container scheduling system of FIG. 3.

Figure 4:
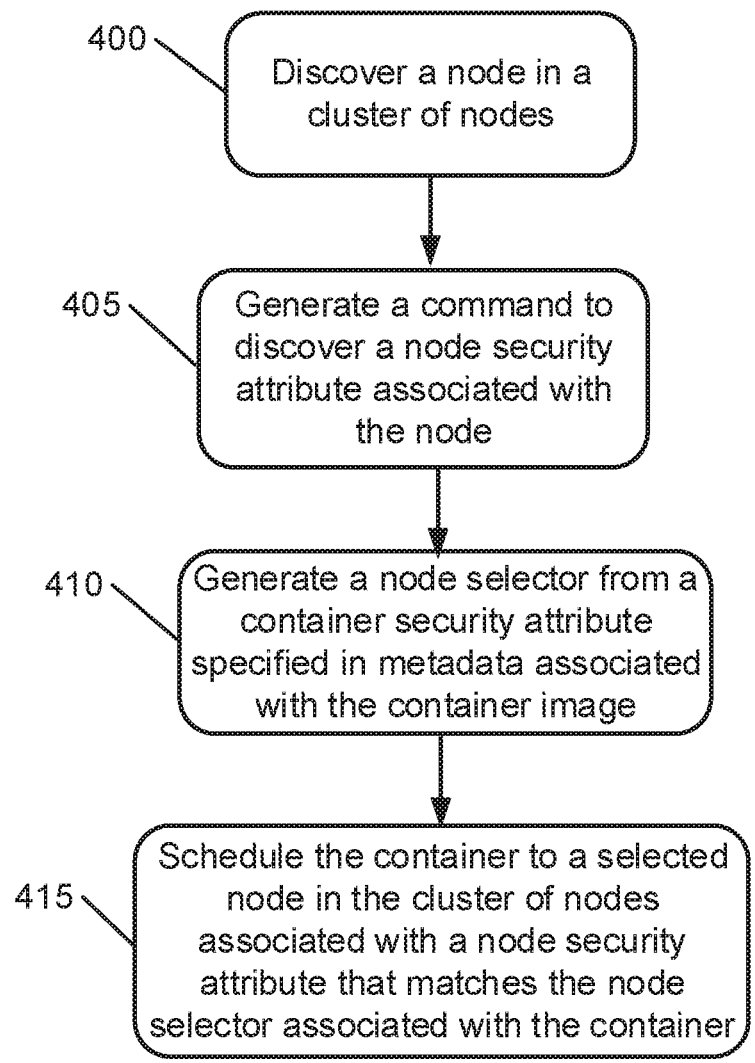
FIG. 4 is a flowchart of example operations of the security-based container scheduling system of FIG. 3.

The operation of security-based container scheduling system 300 is now described in detail with reference to FIG. 4. First, a node is discovered by the discovery engine 315 (400). The node may be a part of a cluster of nodes provisioned to host containers for an administrator. For each discovered node in the cluster, the discovery engine 315 generates a command to discover a node security attribute that is associated with the discovered node (405). Next, the translation engine 320 generates a node selector from a container security attribute specified in metadata associated with a container image (410). The node selector is used by the administrator when deploying a container to run in the cluster such that the node selector is inserted in a container creation template or passed as a parameter in the container creation CLI/API. The container is then scheduled for deployment in a selected node in the cluster of nodes (415). The selected node is one that has a node security attribute that matches the node selector associated with the container. The scheduling may be performed by scheduler plug-in 325 and container scheduler 340 in container orchestration engine 335 as described above with reference to FIG. 3.

Figure 5:
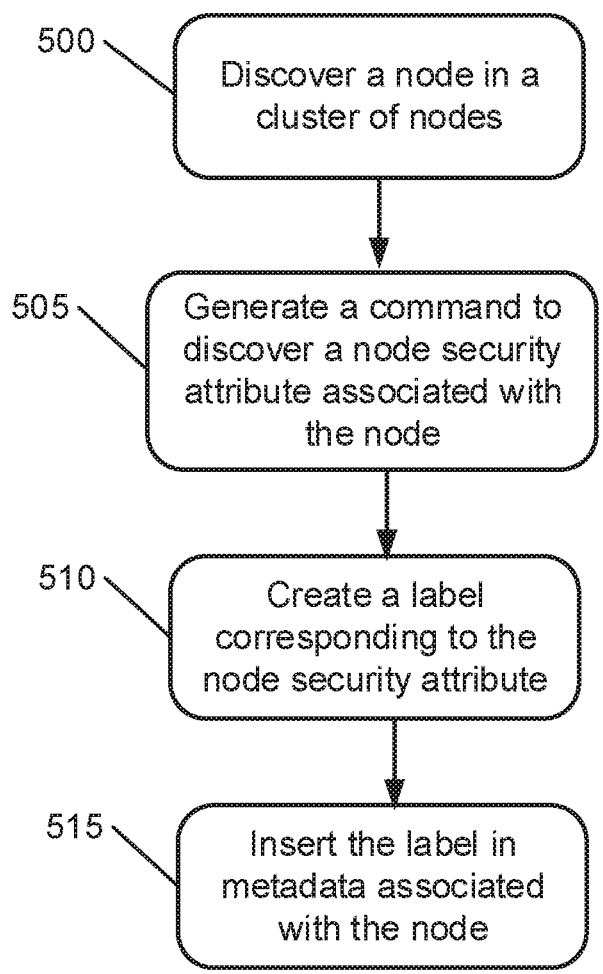
FIG. 5 is a flowchart of example operations of a discovery engine which may be implemented in the security-based container scheduling system of FIG. 3.

Referring now to FIG. 5, a flowchart of example operations of a discovery engine which may be implemented in the security-based container scheduling system of FIG. 3 is described. The discovery engine 315 first discovers a node in a cluster of nodes (500). The discovery may be done in a number of ways, including using LLDP, SSDP, or iLO Federation, among others. Next, the discovery engine 315 generates a command to discover a node security attribute associated with the node (505). The node security attribute specifies a security feature included in the node, such as whether secure boot is enabled, whether the node has TPM hardware, whether the node has a specific firmware version that includes hot security fixes and so on. Once all security attributes of nodes in a cluster are discovered, the discovery engine 315 then creates labels corresponding to the security attributes (510) and inserts them in metadata associated with the nodes (515). The discovery engine 315 may also register the node security attributes in a container resource database associated with container scheduler 340.

Figure 6:
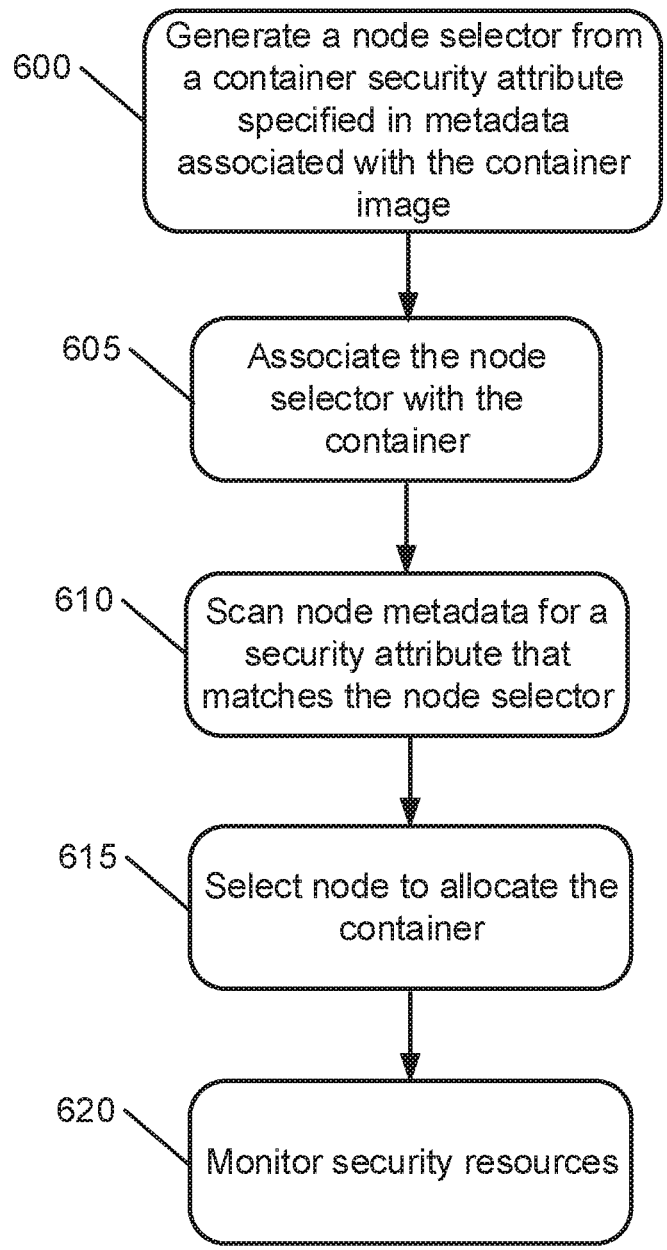
FIG. 6 is a flowchart of example operations of a translation engine, a container scheduler and a resource tracker which may be implemented in the security-based container scheduling system of FIG. 3.

Attention is now directed to FIG. 6, which shows a flowchart of example operations of a translation engine, a container scheduler and a resource tracker which may be implemented in the security-based container scheduling system of FIG. 3. Translation engine 320, as described above, automatically generates a node selector from a container security attribute specified in container's image metadata when a container creation request arrives at the security-based container scheduling system 300 (600). The translation engine 320 then associates the node selector with the container (605) by either adding the node selector to the container creation template or passing it as a parameter in the container creation CLI/API.

Once the node selector is embedded in the container creation template or CLI/API, container scheduler plug-in 325 and container scheduler 340 are ready to allocate the container to a node. Container scheduling is performed by first scanning node metadata for a security attribute that matches the node selector (610). A node that has a matching security attribute to the node selector is then selected to host the container (615). If a specific security resource needs to be allocated to a container, the security-based container scheduling system 300 keeps track of security resources by monitoring their availability throughout container deployment (620). This monitoring is performed by resource tracker engine 330, which may keep a list of all available security resources. Scheduler plug-in 325 checks whether the selected node still has the available security resource before placing the container on the node. After the container has been created on the node, the scheduler plug-in 325 then allocates the security resource to the container and removes the allocated security resource from the list of available security resources.

Figure 7:
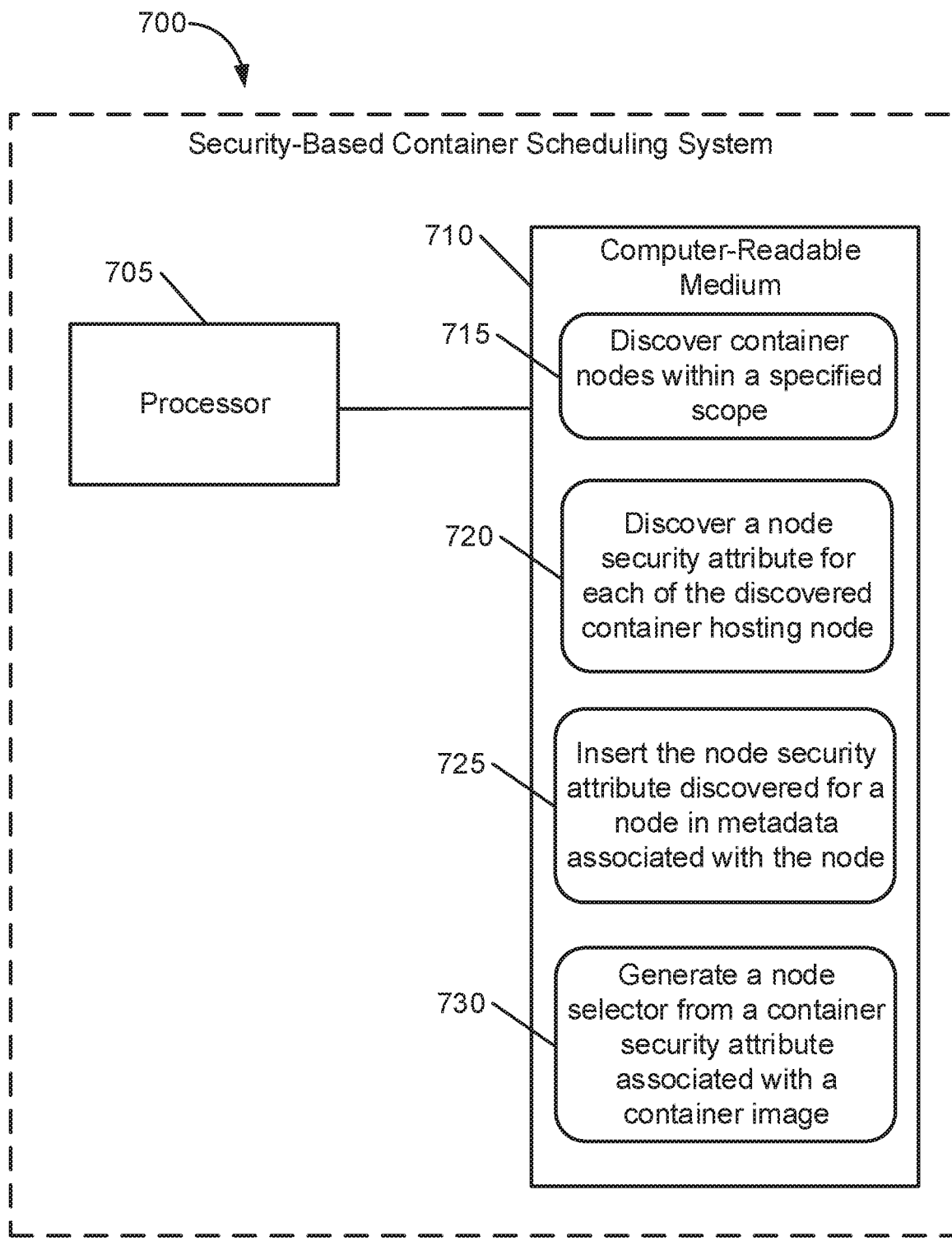
FIG. 7 is another block diagram of an example security-based container scheduling system which may be incorporated into the environment of FIG. 1.

Attention is now directed to FIG. 7, which shows another block diagram of an example security-based container scheduling system which may be incorporated into the environment of FIG. 1. Security-based container scheduling system 700 includes a processor 705 and a tangible, non-transitory computer-readable medium 710 storing instructions 715-730 that are executed by the processor 705. Computer-readable medium 710 can include volatile and/or non-volatile memory such as Random Access Memory ("RAM"), magnetic memory such as a hard disk and/or tape memory, a Solid State Drive ("SSD"), flash memory, phase change memory, memristive memory, and so on.

Instructions 715 include instructions to discover container nodes within a specified scope. The container nodes may be virtual or physical nodes in a cluster for hosting multiple containers. Once all nodes in the cluster are discovered, instructions 720 discover a node security attribute for each of the discovered nodes. The node security attributes may include any security-related attribute for a node, such as, for example, TPM, secure boot, SSL/TLS versions, FIPS enables, and OS and firmware versions with hot security fixes, among others. The discovered node security attributes are inserted as labels in node metadata by instructions 725. Lastly, instructions 730 generate a node selector from a container security attribute associated with a container. The node selector is embedded in a container creation template or passed as a parameter in the container's CLI/API so that the container can be allocated to a node that has a matching security attribute. Doing so enables security to be automatically integrated upfront and maintained throughout container development and deployment.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A security-based system for allocating a container to a node, comprising:
   a processor; and
   a memory resource storing a set of instructions executable by the processor, the set of instructions executable by the processor to:
   discover a node in a cluster of nodes;
   discover a node security attribute associated with the node based on metadata associated with the node;
   generate a node selector from a container image security attribute specified in metadata associated with a container image, wherein the container is a running instance of the container image and the metadata associated with the container image is converted into the node selector for a template;
   deploy the container to run on the node when the node security attribute matches the container image security attribute;
   monitor a set of security resources in the cluster of nodes; and
   allocate a security resource to the container and remove the security resource from a resource pool associated with the selected node.

2. The system of claim 1, comprising instructions to create a label corresponding to the node security attribute and insert the label in metadata associated with the node.

3. The system of claim 2, wherein the node selector is associated with the container image.

4. A computer implemented method for scheduling a container, comprising:
   discover a node in a cluster of nodes and a node security attribute associated with the node;
   generating a node selector from a container image security attribute specified in metadata associated with a container image, wherein the container is a running instance of the container image and the metadata associated with the container image is converted into the node selector for a template;
   scheduling the container to a selected node in the cluster of nodes associated with a node security attribute that matches the node selector;
   deploying the container to run on the selected node when the node security attribute matches the container image security attribute;
   monitoring a set of security resources in the cluster of nodes; and
   allocating a security resource to the container and remove the security resource from a resource pool associated with the selected node.

5. The method of claim 4, further comprising creating a label corresponding to the node security attribute and inserting the label in metadata associated with the discovered node.

6. The method of claim 4, further comprising associating the node selector with the container image via a container creation template.

7. The method of claim 4, further comprising monitoring a set of security resources in the cluster of nodes.

8. The method of claim 4, further comprising registering the node security attribute in a container resource database.

9. A non-transitory computer readable medium comprising instructions executable by a processor to:
   discover a set of container hosting nodes within a specified scope;
   discover a node security attribute for each of the discovered container hosting nodes;
   insert the node security attribute discovered for a node in metadata associated with the node;
   generate a node selector from a container image security attribute associated with a container image, wherein the metadata associated with the container image is converted into the node selector for a template;
   deploy a container to run on a node selected by the node selector when the node security attribute matches the container image security attribute of the container image, wherein the container is a running instance of the container image;
   monitor a set of security resources in the cluster of nodes; and
   allocate a security resource to the container and remove the security resource from a resource pool associated with the selected node.

10. The non-transitory computer readable medium of claim 9, wherein the set of container hosting nodes within a specified scope comprises one of a set of container hosting nodes connected to a switch, a set of container hosting nodes connected to a vLAN, a set of container hosting nodes connected to a rack, a set of container hosting nodes in a specified IP range, a set of container hosting nodes in a cluster of nodes, or a set of container hosting nodes in a logical group.

11. The non-transitory computer readable medium of claim 9, wherein to discover a node security attribute comprises to generate a node security attribute command.

12. The non-transitory computer readable medium of claim 9, further comprising instructions executable by the processor to schedule the container to a selected container hosting node from the set of discovered container hosting nodes having a node security attribute that matches the container image security attribute associated with the container image.

* * * * *